Nov. 10, 1970

H. G. MULLER 3,538,541

APPARATUS FOR ORIENTING SHRIMPS

Filed March 14, 1969

INVENTOR
HENDRIKUS GERHARDUS MULLER

BY *Young + Thompson*

ATTORNEYS

INVENTOR
HENDRIKUS GERHARDUS MULLER

Nov. 10, 1970  H. G. MULLER  3,538,541
APPARATUS FOR ORIENTING SHRIMPS
Filed March 14, 1969  8 Sheets-Sheet 6

INVENTOR
HENDRIKUS GERHARDUS MULLER
BY Young & Thompson
ATTORNEYS

United States Patent Office 3,538,541
Patented Nov. 10, 1970

3,538,541
APPARATUS FOR ORIENTING SHRIMPS
Hendrikus Gerhardus Muller, Hengelo, Netherlands, assignor to N.V. Machinefabriek B & S Bedrijven v.d. Woerdt
Filed Mar. 14, 1969, Ser. No. 807,317
Claims priority, application Netherlands, Mar. 14, 1968, 6803637
Int. Cl. A22c 29/00
U.S. Cl. 17—71        17 Claims

ABSTRACT OF THE DISCLOSURE

Shrimps are uniformly oriented in a work station to which they are delivered and from which they are removed by at least one conveyor. A slide pushes the shrimps transversely to the direction of movement of the conveyor, the slide being at a height to contact only the body and not the tail of the shrimp. The slide pushes the shrimp only so far, so that if the shrimp is advanced tail first, then the tail will extend beyond the position occupied by the body if the shrimp is advanced body first. A turning device contacts the tail, if the shrimp is tail first, to turn the shrimp over so that all the shrimps are uniformly oriented.

---

The present invention relates to apparatus for orienting shrimps so that all the shrimps are uniformly oriented. Curved shrimps reaching the device of the present invention on a conveyor may have one of several different orientations; while shrimps leaving the device of the present invention on a conveyor will all have the same orientation. More particularly, shrimps reaching the device of the present invention may have their curved side directed in the same direction as the movement of the conveyor, or in the opposite direction. Also, the tail of the shrimp can be directed toward one side or the other of the path of movement of the conveyor.

It is an object of the present invention to provide apparatus by which variously oriented shrimps delivered to an orienting station by a conveyor will leave the orienting station with uniform orientation.

Another object of the present invention is the provision of such apparatus, whose accuracy of operation is very high or even 100%.

A still further object of the present invention is the provision of such apparatus, in which shrimps will not become stuck.

Finally, it is an object of the present invention to provide such apparatus, which will be relatively simple and inexpensive to manufacture, easy to install, operate, maintain and repair, rapid in operation, and rugged and durable in use.

Other objects and advantages of the present invention will become apparent from a consideration of the following description, taken in connection with the accompanying drawings, in which.

Figure 1:
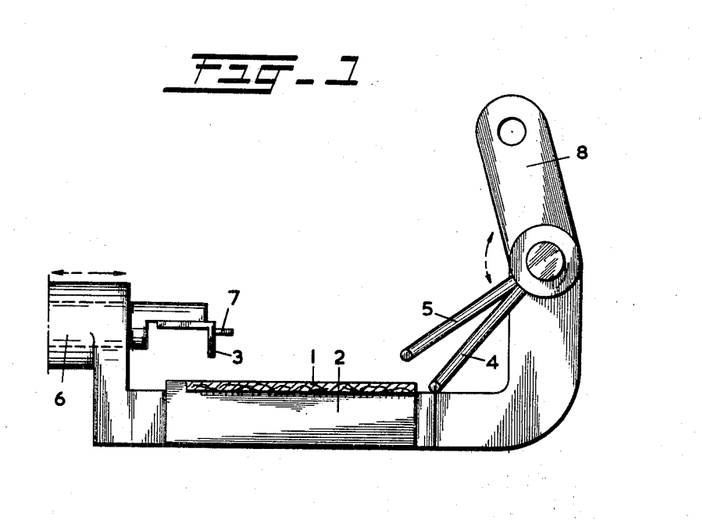
FIG. 1 is a view, taken in the direction of conveyor movement, of a first embodiment of apparatus according to the present invention.
Figure 2:
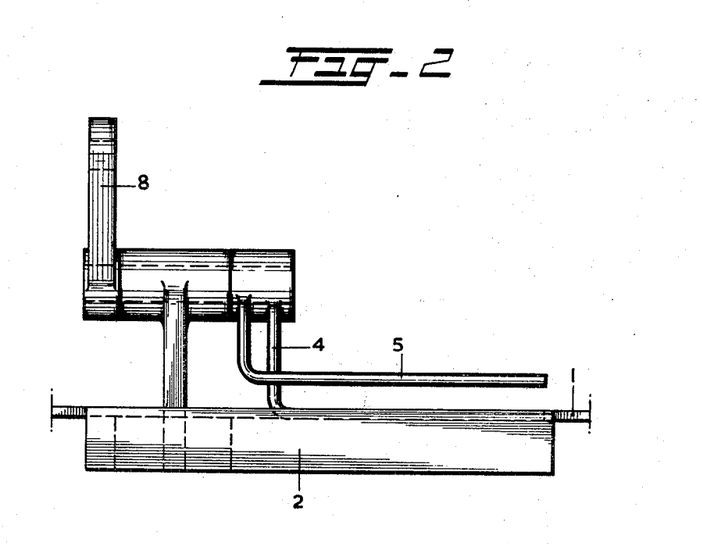
FIG. 2 is a side elevational view of a portion of the structure in FIG. 1.

Referring now to the drawings in greater detail, and first to the embodiment of FIGS. 1 and 2, there is shown an endless belt conveyor whose upper run 1 is shown in FIG. 1 in transverse cross section and travels over a support 2 in a direction perpendicular to the plane of the sheet of drawing. Support 2 carries at one side a horizontally reciprocable slide 3 and at its other side vertically swinging rods 4 and 5 that extend parallel to the direction of travel of the conveyor.

Slide 3 is guided for horizontal sliding movement in a guide 6 and has a downwardly directed flange having a horizontal lower edge which is spaced above the conveyor a distance to permit the tail portion of a shrimp to move therebeneath but close enough to the conveyor to engage the thicker body portion of the shrimp and to push the shrimp by its body transversely across the conveyor toward the rods 4 and 5. A horizontal plate 7 is carried by slide 3 to prevent the shrimp from rolling over while being pushed.

In their initial position, the rod 4 is no higher than the upper surface of the conveyor, while the rod 5 is the same distance above the conveyor as the lower edge of slide 3. Thus, in the FIG. 1 position, if the shrimp is pushed across the conveyor tail first, the tail will enter between rods 4 and 5, but the shrimp cannot be forced off the conveyor because rod 5 would engage the body of the shrimp and limit the movement of the shrimp.

Rods 4 and 5 are mounted for vertical swinging movement as a unit on a horizontal axis, in the direction of the curved arrow in FIG. 1. To this end, an arm 8 rotates a horizontal shaft on which rods 4 and 5 are mounted. Conventional transmission means (not shown) comprising gearing and cams and levers synchronize the movement of the slide 3 and rods 4 and 5 so that they act in timed sequence with respect to each other, and also if desired, in timed sequence with the conveyor and with equipment for positioning the shrimps on the conveyor in a predetermined spaced fashion.

In operation, let it be assumed that all the shrimps carried by the conveyor in spaced relation have their curved backs pointing in the same direction as conveyor movement, but that they are randomly oriented as to whether their tails point to the left or right as seen in FIG. 1. Slide 3 will push each of these shrimps a certain distance across the conveyor. If the relatively thick head end of the shrimp is disposed toward the right in FIG. 1 and the relatively narrow tail portion toward the left in FIG. 1, then slide 3 will push the shrimp toward rods 4 and 5 a distance such that upon vertical swinging movement, rods 4 and 5 will not turn the shrimp. The shrimp is thus carried along the conveyor without reorientation, in what will be called the desired orientation.

But if the tail is to the right and the head to the left in FIG. 1, then slide 3, by performing exactly the same stroke as before, will move the shrimp to a position in which the tail projects between rods 4 and 5. Then, upon vertical swinging movement of rods 4 and 5 clockwise as seen in FIG. 1, the shrimp will be rolled over so that the position of its head and tail are reversed and the shrimp assumes a position on the conveyor which is the same as the shrimp previously described whose orientation was not changed, namely, the desired position.

Figure 3:
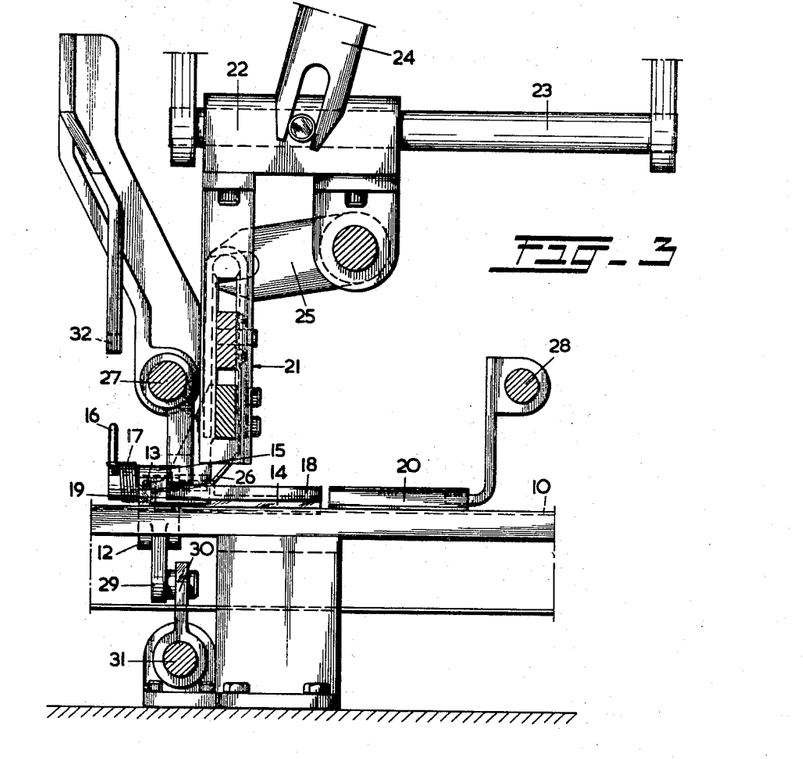
FIG. 3 is a side elevational view of another embodiment of appartus according to the present invention.
Figure 4:
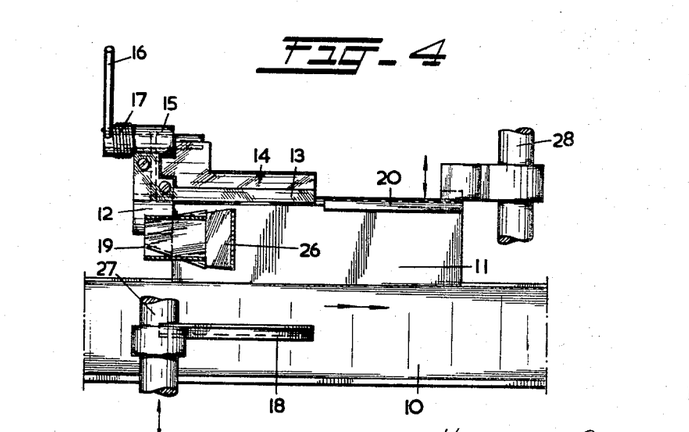
FIG. 4 is a fragmentary top plan view of the structure of FIG. 3, with portions in section for clarity.
Figure 5:
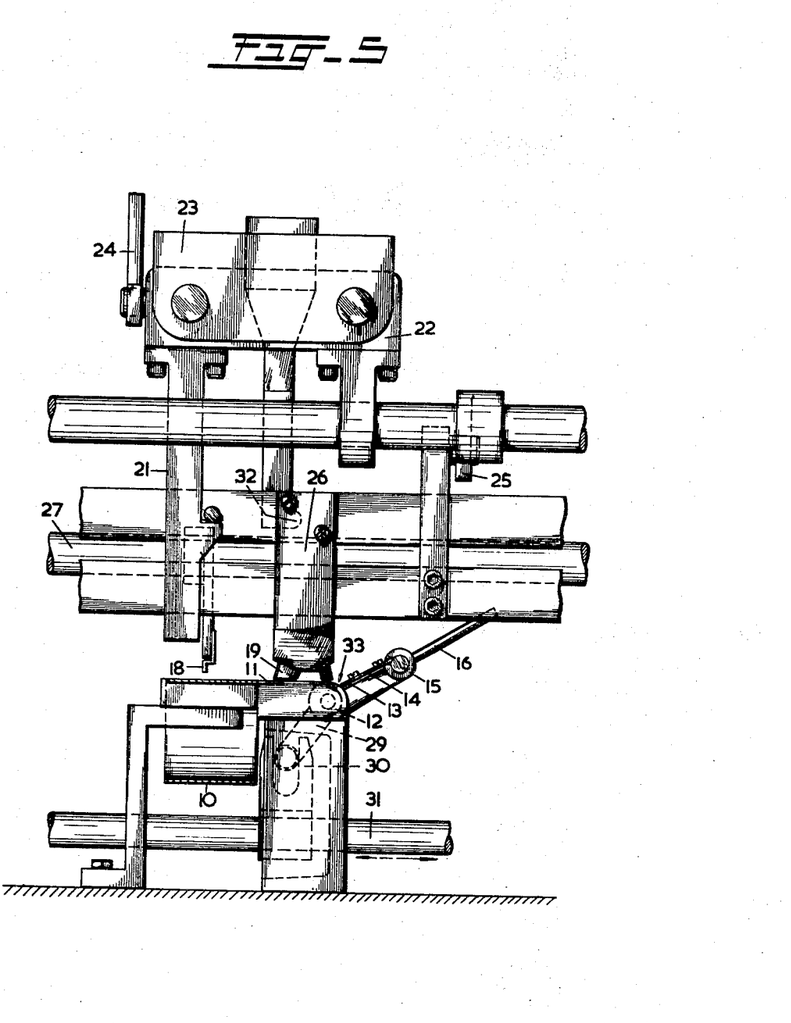
FIG. 5 is an end elevational view of the structure of FIG. 3 as viewed from the right.

In the apparatus of FIGS. 1 and 2, therefore, the orientation is performed on the conveyor itself. In the apparatus of FIGS. 3–5, by contrast, the orientation is performed on a support located next to the conveyor. In FIGS. 3–5, a belt conveyor 10 has a stationary support 11 next to it, with the upper surfaces of conveyor 10 and support 11 coplanar. An oscillatable shaft 12 extends parallel to support 11 on the side opposite conveyor 10 and carries a member 13 elongated parallel to the direction of movement of the conveyor. Member 13 carries a shaft 15 which is parallel to and spaced from shaft 12 and which in turn carries an elongated member 14 which is parallel but swingable relative to member 13. Shaft 15 carries a lever 16 by which shaft 15 is swung relative to shaft 12, and a spring 17 acts on lever 16 to urge the parts to the position of FIGS. 4 and 5.

A transversely movable slide 18 is disposed above the conveyor for pushing the shrimps the same as the slide 3 in FIGS. 1 and 2.

A catching member 19 is provided above support 11, which moves in a lowered position to the right along support 11 as seen in FIGS. 3 and 4, then rises and moves back to the left in FIGS. 3 and 4 in raised position, and then lowers again to its initial position shown in FIGS. 3 and 4. The purpose of catching member 19 is to move the shrimps which have been moved transversely off conveyor 10 by slide 18, and oriented by the members 13, 14, to the right as seen in FIGS. 3 and 4 into the path of a reciprocating slide 20 while still maintaining the desired orientation of the shrimps. The slide 20, in turn, returns the shrimps to the conveyor 10 where they resume their travel on and in the direction of movement of the conveyor.

The structure and operation of catching member 19 are described in greater detail in connection with corresponding structure in the embodiment of FIGS. 6–8. For purposes of describing the embodiment of FIGS. 3–5, therefore, suffice it to say only that the catching member 19 is carried by a support 21 which is horizontally movable with a bushing 22 slidably mounted for reciprocation on horizontal rods 23 and slide therealong in reciprocating fashion by a swinging fork 24 which effects the horizontal strokes of member 19. Another swinging fork 25 moves the member 19 along the vertical components of its path.

As will be seen from FIGS. 4 and 5, catching member 19 has a pair of V-shaped walls that open in the direction in which member 19 slides the shrimps to the right along support 11 as seen in FIG. 4. To ensure that the shrimps remain behind on support 11 when member 19 rises at the end of its conveying stroke, an ejector 26 is disposed between the V-shaped walls of member 19 and remains in its lower position until it is at about the level of the rising lower edges of the member 19, after which ejector 26 also moves upwardly. Slide 18 is carried by an axially reciprocable shaft 27; while slide 20, in turn, is carried by an axially reciprocable shaft 28. The details of the mounting and movement of members such as these members 18, 20 and 26 are also more fully disclosed in connecting with the next embodiment, that of FIGS. 6–8.

Returning now to the shrimp orienting mechanism best seen in FIGS. 4 and 5, it will be noted that shaft 12 has an arm 29 thereon which is oscillated by fork 30 carried by an axially reciprocable shaft 31. In operation, when a shrimp is disposed with its tail extending over members 13 and 15 and a thicker body portion of the shrimp disposed in the shallow depression 33 seen in FIG. 5, shaft 31 is then moved to the right to rotate shaft 12 a portion of a turn counterclockwise as seen in FIG. 5. The parts 12–16 swing counterclockwise as a unit, until lever 16 strikes a fixed abutment 32, which causes member 14 to swing clockwise out of the plane of member 13 as seen in FIG. 5 and give a flick to the tail portion of the shrimp resting against it, so that the shrimp is caused to roll over and lie on conveyor 10 with its tail directed to the left as seen in FIG. 5. Thereafter, the shrimp is moved by members 19 and 20 first parallel to and then perpendicular to the direction of movement of conveyor 10 and return to conveyor 10 for conveyance away from the orienting station.

The member 19 of course remains raised during the operation of the members 12–18 and is lowered only immediately before and raised immediately after its conveying function.

Figure 6:
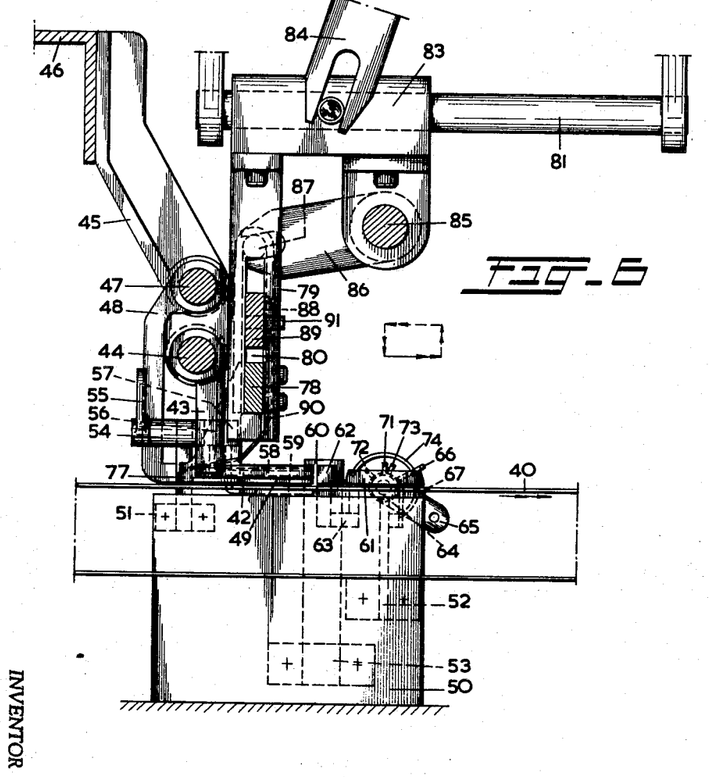
FIG. 6 is a view similar to FIG. 3 but showing a third embodiment of the present invention.
Figure 7:
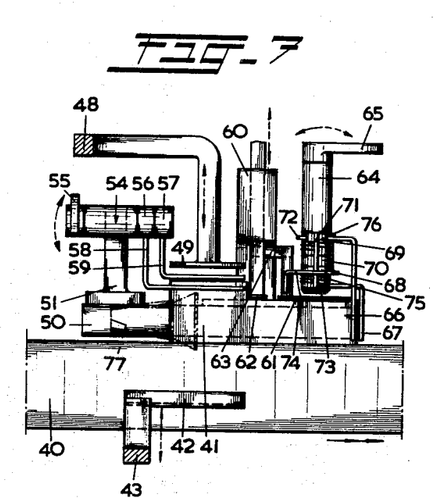
FIG. 7 is a view similar to FIG. 4 but showing the embodiment of FIG. 6.
Figure 8:
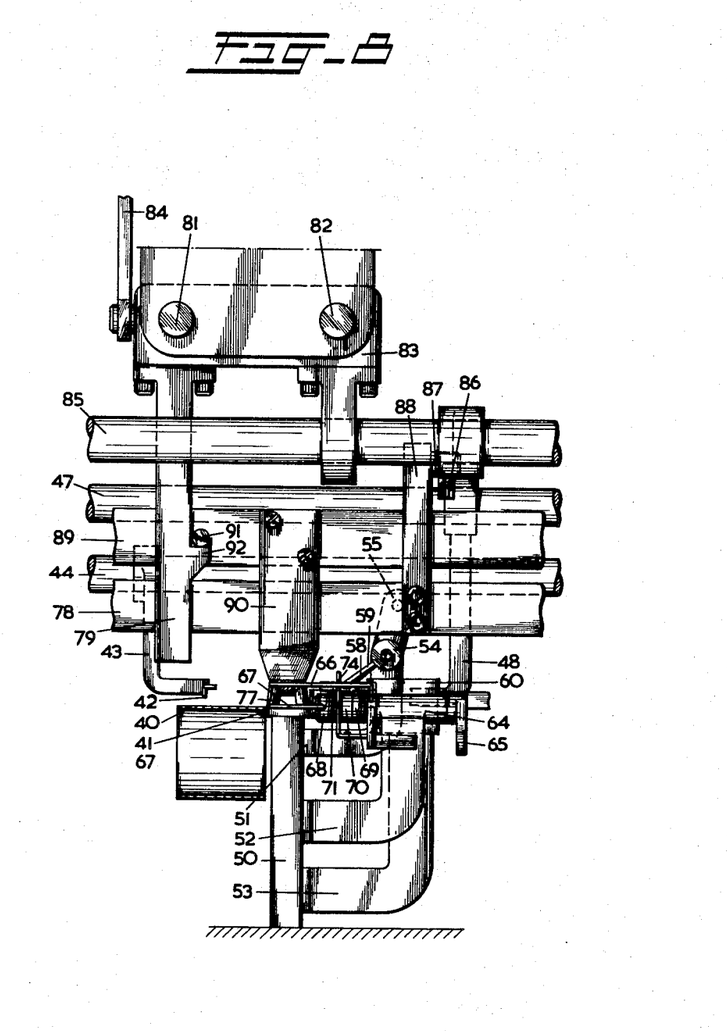
FIG. 8 is a view similar to FIG. 5 but showing the embodiment of FIGS. 6 and 7.

The embodiment of the apparatus of FIGS. 6–8 is similar to that of FIGS. 3–5 in that the shrimp are swept laterally off the conveyor onto a stationary support, oriented, and then return to the conveyor. The device of FIGS. 3–5 however, could perform only a single orientation, so that the shrimp had to be supplied to the device of FIGS. 3–5 in one of the two positions: tail to the left or tail to the right, with the convexities of the curled shrimp all pointing in the same direction.

But with the device of FIGS. 6–8, it is possible to handle shrimps which are not only misoriented as to the direction in which their heads and tails lie, but also misoriented as to the direction in which their curled backs lie. Thus, in FIGS. 6–8, the shrimps are first swept off the conveyor and turned tail-for-head if needed, and then the shrimps are oriented by rolling them over about their curved backs, if needed, before returning them to the conveyor.

In greater detail, the device of FIGS. 6–8, comprises a belt conveyor 40 with an adjacent coplanar stationary support 41 to which shrimps are transferred by a transversely movable slide 42 carried by an arm 43 on a shaft 44 which is axially reciprocated. Shaft 44 is carried by a bracket 45 secured to a frame beam 46. Bracket 45 also carries axially reciprocable shaft 47 which carries an arm 48 at whose lower end is disposed a correction slide 49 disposed parallel to slide 42 and that moves parallel to slide 42 across the surface of support 41 to correct the position of shrimps thereon after the shrimps have undergone their first orientation.

Support 41 is carried by a frame 50 to which are secured brackets 51, 52 and 53. Shaft 54 is journaled in bracket 51 and carries at one end an arm 55 by which shaft 54 is oscillated. At its other end, shaft 54 carries bushings 56 and 57 on which rods 58 and 59, respectively, are mounted. Rods 58 and 59 are parallel to the direction of movement of conveyor 40 and perform an orienting function like that of the rods 4 and 5 in the embodiment of FIGS. 1 and 2.

Bracket 53 carries a guide bushing 60 for a transverse slide comprised by slide portions 61 and 62 that are interconnected by a brace 63.

Bracket 52 carries a bearing 64 for a horizontal shaft which is oscillated by an arm 65. Rods 66 and 67 are secured to bushings 68 and 69, respectively, which are freely rotatable on that shaft. Bushing 70, rigidly mounted on that shaft, is disposed between bushings 68 and 69. A rod 71 parallel to rods 66 and 67 is carried by bushing 70 and extends over bushings 68 and 69 and is engageable with a stop pin 72 on bushing 69 and stop pin 73 on bushing 68.

Bracket 53 also carries a fixed stop bar 74. Stop pin 73 is engaged by a spring 75 the other end of which engages the rod 71 to urge stop pin 73 against rod 71 so that rod 67 is coupled to the bushing 70 and thus to the shaft which is moved by the arm 65.

Bushing 69 is surrounded by a spring 76, one end of which engages stop pin 72 and the other end of which. In the initial position of the parts, shown in FIG. 8, rod 66 is some distance above rod 67, so that the head and tail portions of a shrimp can slide underneath rod 66. When the arm 65 is operated, rod 67 moves upward, because it is carried along by a spring 75. The head and tail portions are thus gripped between the rods 66 and 67. As the movement continues, the rod 66 also turns, and this joint movement continues until the stop pin 73 abuts against the end of stop bar 74, whereupon rod 71 moves only the rod 66 farther, while the rod 67 remains behind as is dictated by the spring 75. The gripping action on the head and tail portions of the shrimp is thus eliminated, and the shrimp thus comes to rest in a proper position on the support, since it has been rolled over by the movement of the rods 66 and 67 about the curvature of its back.

The slide comprised by members 61 and 62 then moves downward in FIG. 7, to return the twice-oriented shrimp to the conveyor 40. The gap between the members 61 and 62 accommodates the rod 66 and in fact is provided for this purpose.

The movement between the two orienting stations, when the shrimp is slid along the support 41 parallel to the direction of movement of the conveyor, is performed by a catching member 77 which follows a rectangular path as seen in FIG. 6, whose lowermost leg is adjacent the surface of the support 41 and is directed to the right as seen in FIG. 6, and whose uppermost leg is spaced well above the support 41 and directed to the left as seen in FIG. 6.

To perform this movement, member 77 is carried by a flat bar 78 which is guided in a slot 80 of a member 79 that extends vertically downward. Member 79 is secured to bushing 83 which is slidable on horizontal rods 81 and 82 and is reciprocated along these rods by fork 84. Bushing 83 carries an oscillatable shaft 85 whose fork 86 engages a pin 87 of a brace 88 by which it is secured to bar 78. A bar 89 is also guided in slot 80 and carries ejector 90 which operates like ejector 26 in FIGS. 3–5. Bar 89 is supported by pin 91 on a stop 92 of the member 79 (see FIG. 8).

Upon oscillatory movement of fork 84, bushing 83 and the entire member 77 are reciprocated horizontally. Oscillatory movement of the fork 86, on the other hand, acts through the brace 88 and bar 78 to raise and lower member 77, with the bar 89 and ejector 90 having an initial dwell period in their lowermost position and then rising when the lower edges of member 77 are about at the level of ejector 90. The bar 89 resumes its initial position upon descending movement of the pin 91 onto stop 92.

In the embodiment of FIGS. 9–13, a conveyor 100 is supported in a frame 101. A support 102 is coplanar with conveyor 101, and a V-shaped catching member 103 is horizontally laterally and vertically reciprocable above and across and between conveyor 100 and support 102 to transfer shrimps from the conveyor to the support. Member 103 is carried by an arm 104 secured to an oscillatable and axially reciprocable shaft 105.

Also secured to arm 104 is a slide 106 which is spaced above conveyor 100 and support 102 a distance to override a shrimp's tail but to contact a shrimp's body. The rear wall 107 of member 103 thus pushes a shrimp with a stroke equal in length to the distance between wall 107 and slide 106, after which slide 106 then pushes the shrimp farther to the left as seen in FIG. 11.

On the side of support 102 opposite conveyor 100, a pair of rollers 108 and 109 are disposed at a level slightly below support 102 with their axes parallel to the direction of movement of conveyor 100. There is a narrow gap between the rollers, and both are power driven to rotate clockwise as seen in FIG. 11.

Mounted on frame 101 is another axially reciprocable shaft 110 that carries a bushing 111 which in turn carries an arm 112 that supports a plate 113 whose upper surface is coplanar with support 102. Plate 113 overlies rollers 108 and 109, but toward the end of the working stroke of slide 106 to the left as seen in FIG. 11, plate 113 is also moved a small distance to the left in that figure to uncover the rollers 108 and 109. A shrimp whose tail is directed to the left in FIG. 11 is pushed by the slide 106 until its tail overlies plate 113, so that the tail is supported while the body portion of the shrimp comes to rest on the rollers. In other words, shrimps whose tails point to the left in FIG. 11 will be supported by their tails on the edge of plate 113 with their bodies resting on rollers 108, 109, which accordingly will not turn the shrimps. But if the body comes first and the tail trails, then the body falls into the declivity between rollers 108, 109 and is rotated counterclockwise so that the tail comes to rest against the edge of plate 113.

Figure 11:
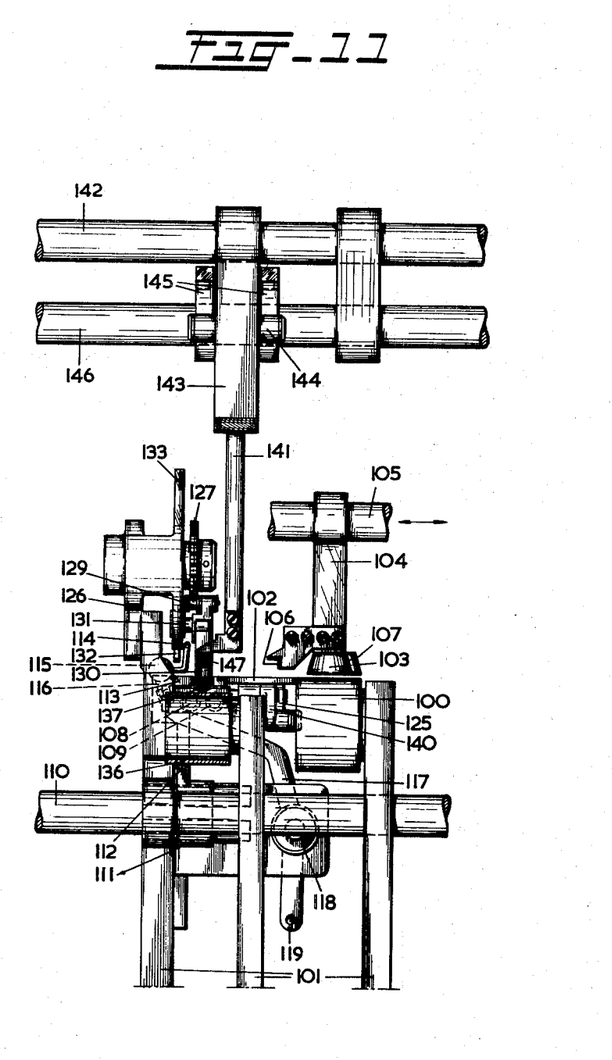
FIG. 11 is a view similar to FIGS. 5 and 8 but showing the embodiment of FIGS. 9 and 10.
Figure 12:
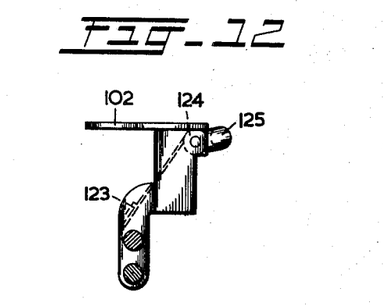
FIG. 12 is a fragmentary cross-sectional elevational view taken on the line XII—XII of FIG. 10.

A positioning rod 114 is provided, which coacts with slide 106 to locate the shrimps properly at the end of their movement under the influence of slide 106 and to prevent them from moving too far to the left as seen in FIG. 11. Rod 114 is carried by a shaft 115 which has a downwardly directed arm 116 that in turn has a transverse pin that engages in a fork 117 pivotally secured to frame 101 at 118. An arm 119 is rigid with fork 117 and drives fork 117 and hence rod 114 through appropriate mechanism (not shown) so that rod 114 and slide 106 release the shrimp at the same time so that it can drop onto the rollers 108 and 109 to be turned if necessary Rollers 108 and 109 carry sprockets 120 and 121 to be driven by chains (not shown).

Figure 10:
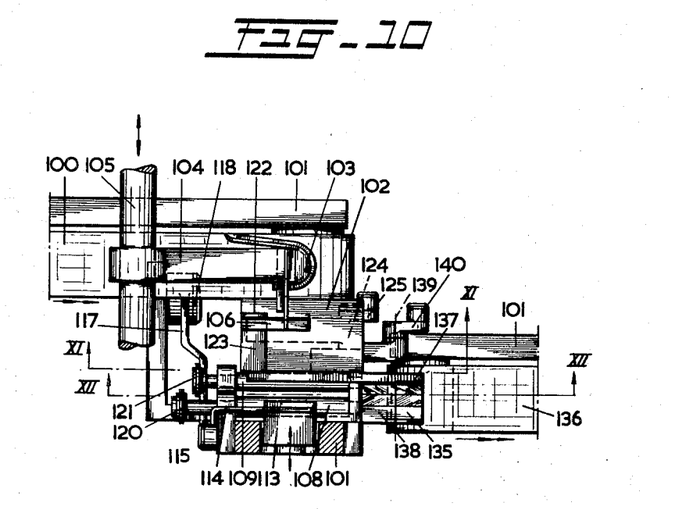
FIG. 10 is a view similar to FIGS. 4 and 7 but showing the embodiment of FIG. 9.

As can be seen from FIG. 10, catching member 103 is generally V-shaped, so that shrimps that arrive at member 103 with the convex sides of their backs foremost move into it farther than do shrimps whose convex sides are rearmost and whose heads and tails are foremost. The present invention provides for separating these two categories of shrimps according to this orientation, with only those whose convex sides are foremost delivered to the rolls 108 and 109. To this end, the support 102 is divided along a line 122, and a portion 123 is mounted for vertical swinging movement on a shaft 124 controlled by an arm 125, as shown generally in FIG. 10 and seen in detail in FIG. 12. Part 123 swings downward at the end of each conveying stroke of member 103, so that each shrimp moved by member 103 will rest partly on part 123 and partly on the remainder of support 102. If the shrimp is desirably oriented with its convexity to the right as seen in FIG. 10, then its center of gravity will lie to the right of the line 122 in FIG. 10 and when part 123 swings downwardly, the shrimp will remain on support 102. But if the shrimp arrives on support 102 with its convexity directed to the left as seen in FIG. 10, then its center of gravity will be on the left side of line 122 in FIG. 10; and when part 123 swings downwardly, the shrimp will be discharged, after which it can be recycled for reorienting.

Frame 101 also carries a support 126 for a pair of sprockets 127, 128 over which travels an endless chain 129 several links of which support carriers 130 which are swingably mounted relative to the chains about axes 131 and which terminate downwardly inpointed ends adapted to fit into the gap between rollers 108 and 109. Carriers 130 also have cam followers 132 thereon that cooperate with fixed cam tracks 133, 134 to position carriers 130 during circulation of the chain 129. When follower 132 reaches cam track 133, its corresponding carrier 130 is swung backwardly as the chain travels around sprocket 127 so that the forward movement of the carrier 130 is arrested at this point and the shrimp which is moved off the rollers 108, 109 by this carrier 130 is thus permitted to come to rest on a plate or table 135 having a V-shaped groove 137 which corresponds to the shape of the gap between the two rollers 108 and 109.

Figure 13:
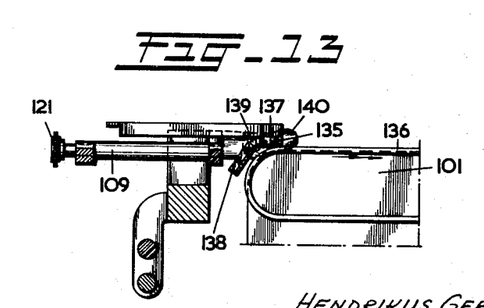
FIG. 13 is a view similar to FIG. 12 but taken on the line XIII—XIII of FIG. 10.

Like the support 102, this table 135 is divided into parts 137, 138, the latter being adapted to swing vertically downwardly about a shaft 139 under the influence of an arm 140, as best seen in FIG. 13. This downward swinging movement of part 138 performs the same function as the downward swinging movement of part 123, and serves as a double check on the orientation of the shrimps so that any misoriented shrimps not removed by the downward swinging movement of part 123 will be removed by the downward swinging movement of part 138.

Figure 9:
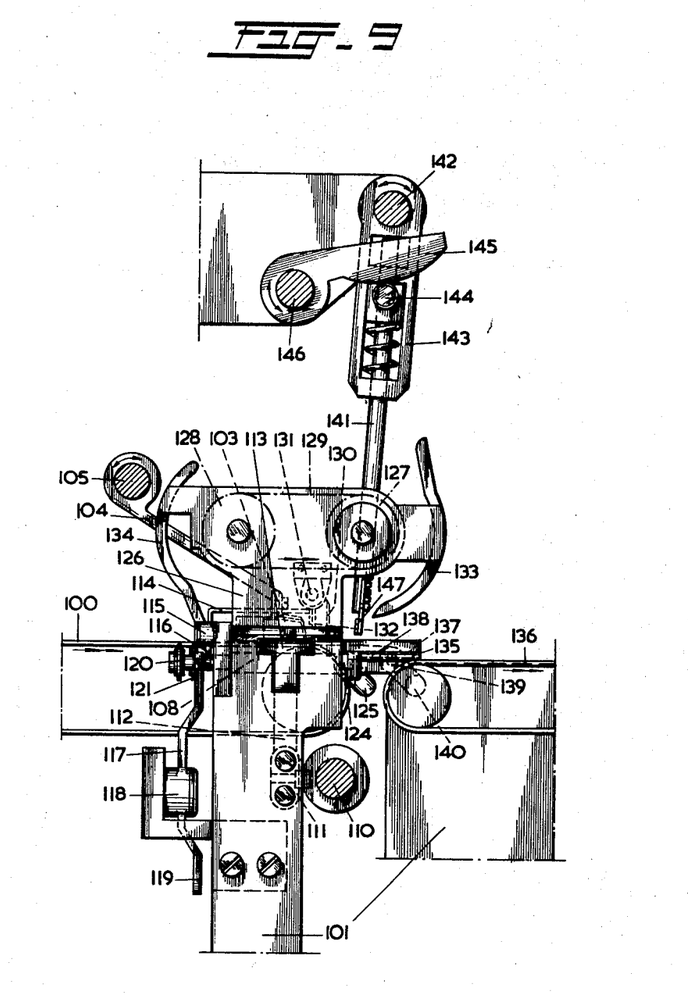
FIG. 9 is a view similar to FIGS. 3 and 6 but showing a fourth embodiment of the invention.

The shrimps are than transferred from table 135 to a further belt conveyor 136 whose upper run moves in the same direction as the upper run of conveyor 100, whence the shrimps are moved to another station such as a shelling station or the like. To transfer the shrimps from the table 135 to the conveyor 136, a lever 141 swings about a shaft 142 journaled in the frame and carrying a housing 143 thereon in which the lever 141 is slidably mounted at its upper end and is spring urged upwardly to a shaft 142. A pin 144 on lever 141 is engaged by cam 145 fixed to an oscillatable shaft 146, and the shafts 142 and 146 are oscillated in timed relation to cause the lower end 147 of lever 141 to move rectilinearly to the right as seen in FIG. 9, with a velocity no greater than that of conveyor 136, to discharge the shrimps onto conveyor 136, and to rise and return and fall behind the next shrimp, and so on. To this end, lower end 147 of lever 141 is pointed to fit in the groove of table 135.

It will of course be understood that the movable parts of the apparatus of the present invention are operated in timed relationship with each other by means of transmissions comprising gearing and cams and levers, which have been omitted so as to avoid needlessly complicating the disclosure. Such transmissions are well known to persons having ordinary skill in this art, and accordingly need not be disclosed in greater detail.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for orienting shrimps, comprising conveyor means for bringing shrimps to and removing shrimps from an orienting station, and in the orienting station a slide disposed at a height to engage the body of a shrimp but to pass over the tail of a shrimp, turning means engageable with the tail of a shrimp to turn the shrimp over, and means for advancing said slide transversely of the direction of movement of the conveyor means to move a shrimp by contact with the body of the shrimp a distance toward said turning means such that if the shrimp's tail is in advance of its body the turning means will contact the tail and turn the shrimp, but if the shrimp's body is in advance of the tail, then the turning means will not turn the shrimp.

2. Apparatus as claimed in claim 1, said turning means comprising a first horizontal rod at the same elevation as said slide and a second horizontal rod a substantial distance below said first horizontal rod, said horizontal rods receiving the tail of a shrimp between them.

3. Apparatus as claimed in claim 2, said slide being movable above said conveyor means and said second horizontal rod in its rest position extending no higher than the conveying surface of said conveyor means.

4. Apparatus as claimed in claim 2, and means for raising said horizontal rods after said slide has performed a transverse stroke.

5. Apparatus as claimed in claim 1, said turning means comprising a fixed support coplanar with the conveyor means, means for transferring shrimps from said conveyor means to said fixed support, said turning means being located on the side of said fixed support opposite said conveyor means, said turning means comprising an assembly vertically swingable about a horizontal axis, and a turning member mounted on said assembly for vertical swinging movement relative to said assembly about a second axis parallel to said horizontal axis, said turning member including a lever engageable with a fixed abutment upon vertical swinging movement of said assembly to swing said turning member relative to said assembly about said parallel axis.

6. Apparatus as claimed in claim 5, said assembly in its initial position forming an abtuse angle with the upper surface of said fixed support.

7. Apparatus as claimed in claim 5, there being a shallow depression between the edge of said fixed support and said assembly.

8. Apparatus as claimed in claim 1, and a fixed support adjacent said conveyor means, means for moving shrimps off said conveyor means onto said fixed support, first turning means for turning misoriented shrimps in one direction on said fixed support, second turning means for turning misoriented shrimps on said fixed support in a direction at right angles to the direction in which said shrimps are turned by said first turning means, means for moving shrimps from said first turning means to said second turning means in a direction parallel to the direction of movement of the conveyor means, and means moving shrimps from said second turning means back onto said conveyor means.

9. Apparatus as claimed in claim 8, said second turning means comprising a pair of rods spaced apart a distance to receive between them a head and tail of a shrimp, and means moving said rods in a downwardly concave arched working stroke above said fixed support such that at the beginning of said stroke, an upper of said rods remains stationary while the lower of said rods moves toward the upper rod while at the end of said stroke the originally lower rod remains at a standstill and the originally upper rod moves on to release the shrimp.

10. Apparatus as claimed in claim 8, said means for moving the shrimps parallel to the direction of movement of the conveyor means comprising a V-shaped catching member that opens in the direction of said second turning means, and means mounting said catching member for vertical and horizontal movement relative to said fixed support so that said catching member conveys a shrimp toward said second turning means in a lower position and returns in an upper position.

11. Apparatus as claimed in claim 8, and a correction slide disposed adjacent said first turning means for movement in a direction perpendicular to the direction of movement of said conveyor means thereby to reposition shrimps on said fixed support after said first turning means has turned the shrimp.

12. Apparatus as claimed in claim 1, said turning means comprising a pair of axially elongated parallel rollers both of which are rotated in the same direction and which are disposed parallel to the direction of movement of said conveyor means, a horizontally movable plate above said rollers, and means for moving said plate to expose said rollers during the last part of the movement of said slide.

13. Apparatus as claimed in claim 12, and a transfer member disposed in the gap between the rollers and movable parallel to the axis of the rollers to remove shrimps from on top of the rollers.

14. Apparatus as claimed in claim 12, and a fixed support coplanar with said conveyor means, and a catching member movable across and above said conveyor means and fixed suport to receive shrimps from said conveyor means and transfer them laterally to said fixed support into a position to be moved further laterally by said slide.

15. Apparatus as claimed in claim 12, and a rod parallel to and above the rollers and on the side of the rollers opposite said slide, and means for moving said rod simultaneously but oppositely with said slide so that said rod and said slide together position shrimps above said rollers.

16. Apparatus as claimed in claim 13, said transfer member comprising a carrier pivotally secured to an endless chain, and cam means to swing said carrier relative to said chain to arrest temporarily the advance of said carrier.

17. Apparatus as claimed in claim 12, said conveyor means including a discharged conveyor that moves away from said rollers in a direction parallel to said rollers, and a plate between said rollers and said discharge conveyor, said plate having a groove in line with the gap between the rollers, and a further slide for moving shrimps, said further slide extending into said groove and being movable along said groove in the direction of said discharge conveyor at a speed no greater than the speed of said discharge conveyor to move shrimps from said plate onto said discharge conveyor.

References Cited

UNITED STATES PATENTS

| 3,229,326 | 1/1966 | Eriksen | 17—54 X |
| 3,408,686 | 11/1968 | Stephenson | 17—71 |

LUCIE H. LAUDENSLAGER, Primary Examiner